United States Patent
Iwashita et al.

(10) Patent No.: US 7,049,775 B2
(45) Date of Patent: May 23, 2006

(54) SERVO MOTOR CONTROL UNIT FOR PRESS-FORMING MACHINE

(75) Inventors: Yasusuke Iwashita, Fujiyoshida (JP); Tadashi Okita, Fujiyoshida (JP); Hiroyuki Kawamura, Yamanashi (JP)

(73) Assignee: Fanuc LTD, Yamanashi (JP)

( * ) Notice: Subject to any disclaimer, the term of this patent is extended or adjusted under 35 U.S.C. 154(b) by 0 days.

(21) Appl. No.: 11/167,203

(22) Filed: Jun. 28, 2005

(65) Prior Publication Data
US 2006/0012326 A1    Jan. 19, 2006

(30) Foreign Application Priority Data
Jun. 28, 2004    (JP)    ............................. 2004-189996

(51) Int. Cl.
*G05B 6/02*    (2006.01)
*B21J 5/00*    (2006.01)

(52) U.S. Cl. ....................... 318/566; 318/609; 318/632

(58) Field of Classification Search ................ 318/560, 318/566–567, 568.22, 609–610, 626, 632; 388/906; 264/349
See application file for complete search history.

(56) References Cited

U.S. PATENT DOCUMENTS

| | | | | |
|---|---|---|---|---|
| 4,011,493 A | * | 3/1977 | Fukase et al. | ........... 318/568.1 |
| 5,552,690 A | * | 9/1996 | Hiraoka | ...................... 318/632 |
| 5,997,780 A | * | 12/1999 | Ito et al. | ..................... 264/40.5 |

* cited by examiner

*Primary Examiner*—Bentsu Ro
(74) *Attorney, Agent, or Firm*—Drinker, Biddle & Reath LLP

(57) ABSTRACT

A servo motor for driving a die is provided with position and speed detectors. Further, a pressure sensor for detecting the pressure applied to a workpiece is provided. In the servo motor control unit, the smaller one of the speed command obtained by feedback control of the position and the speed command obtained by the pressure feedback control is selected as an output of a comparator. Based on the speed command output from the comparator, feedback control of the speed is performed and the servo motor is driven. In the state where the die does not press against the workpiece, a pressure error is large, the speed command by pressure control becomes large, and the speed command by position control becomes small. Therefore, position control is performed. When the workpiece is pressed, the position error increases, and the pressure error decreases, a speed command by pressure control is employed and pressure control is performed.

14 Claims, 11 Drawing Sheets

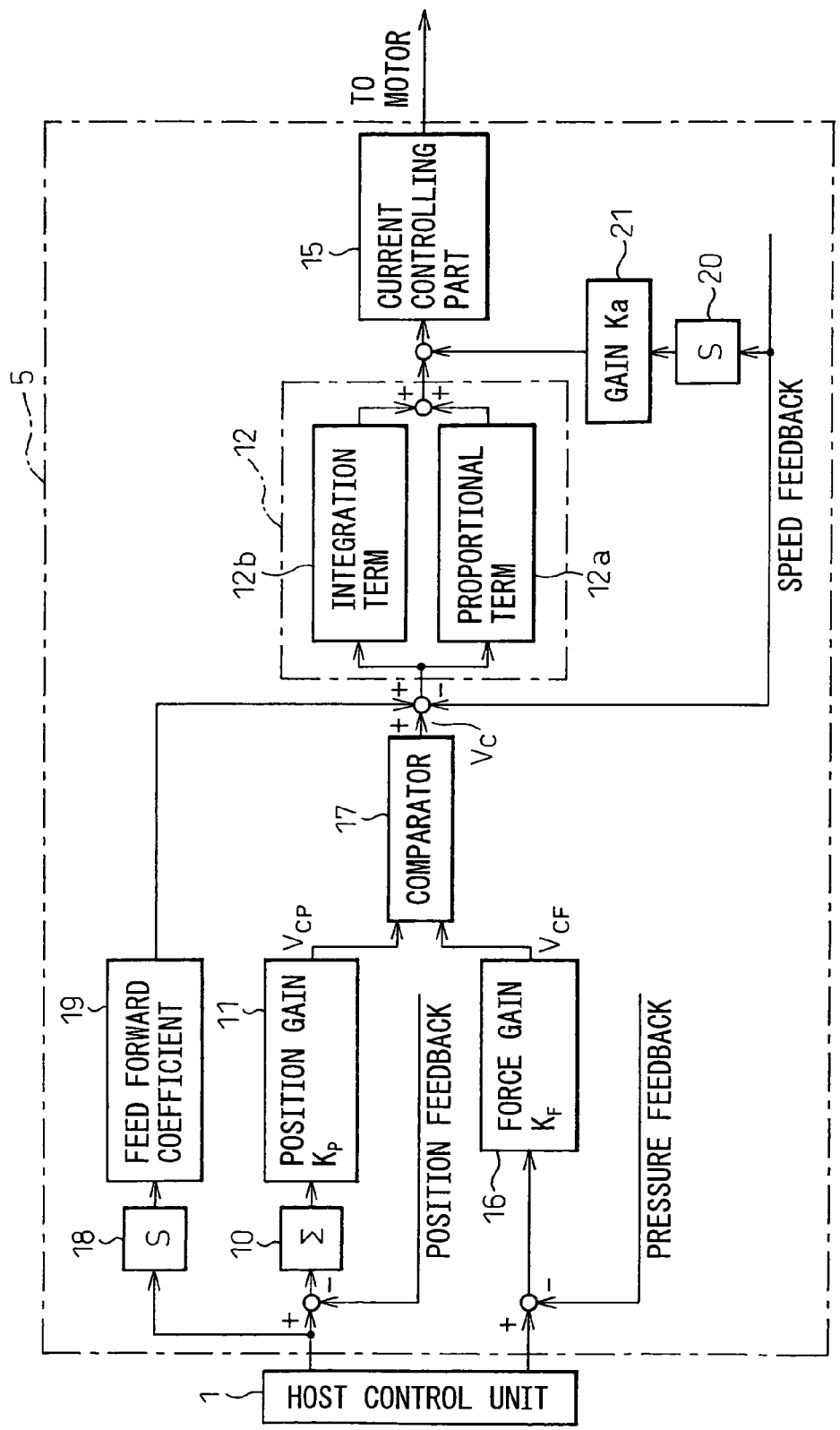

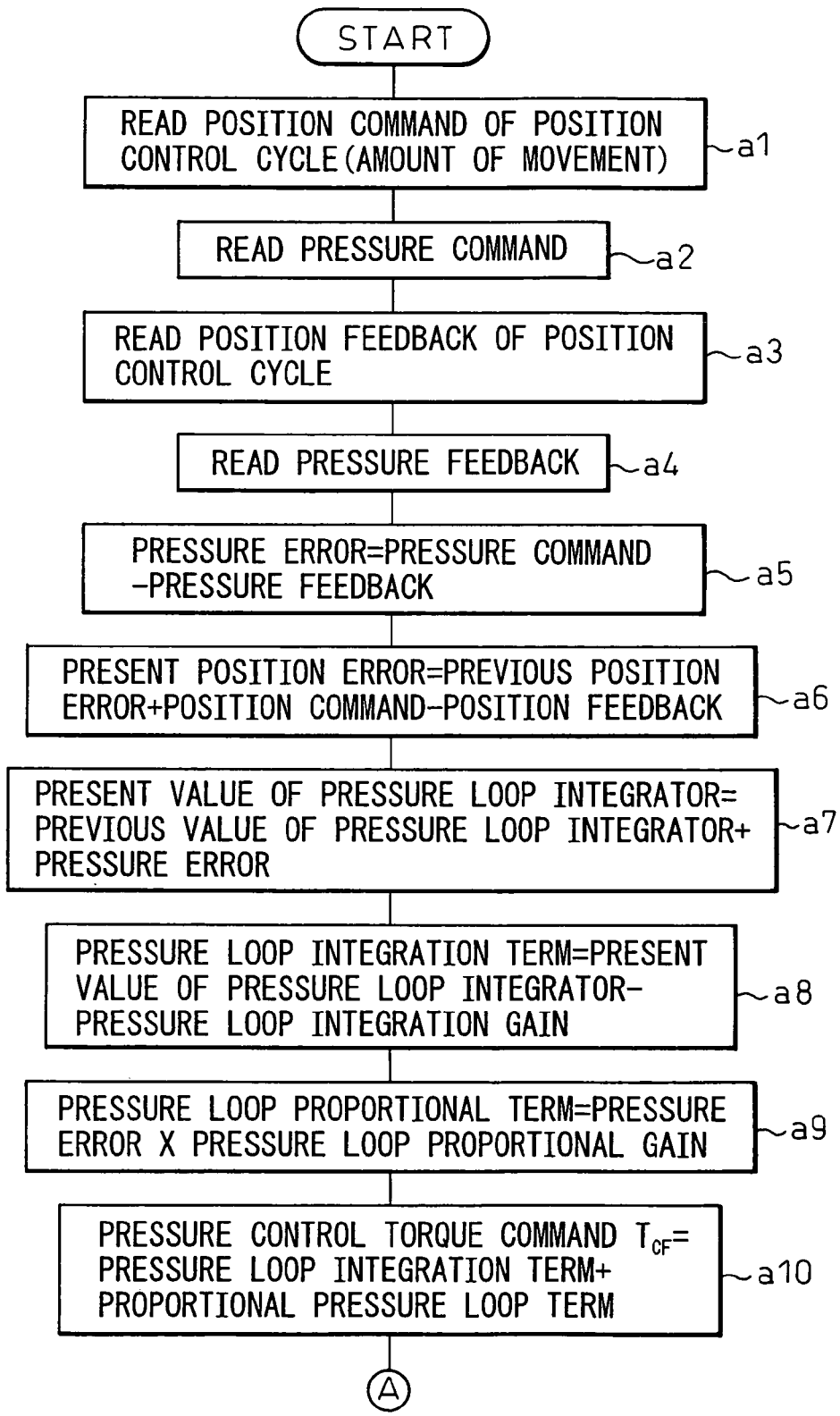

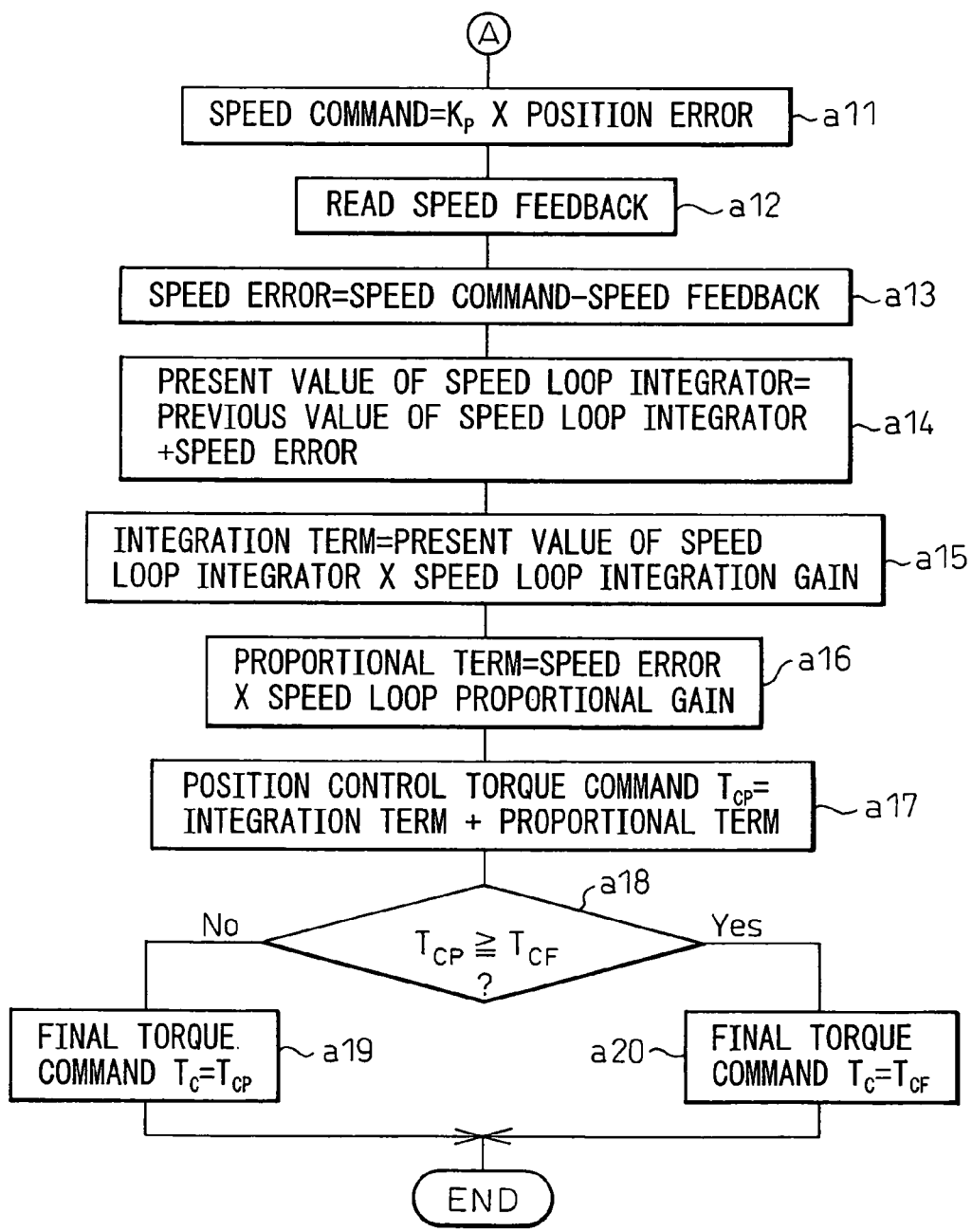

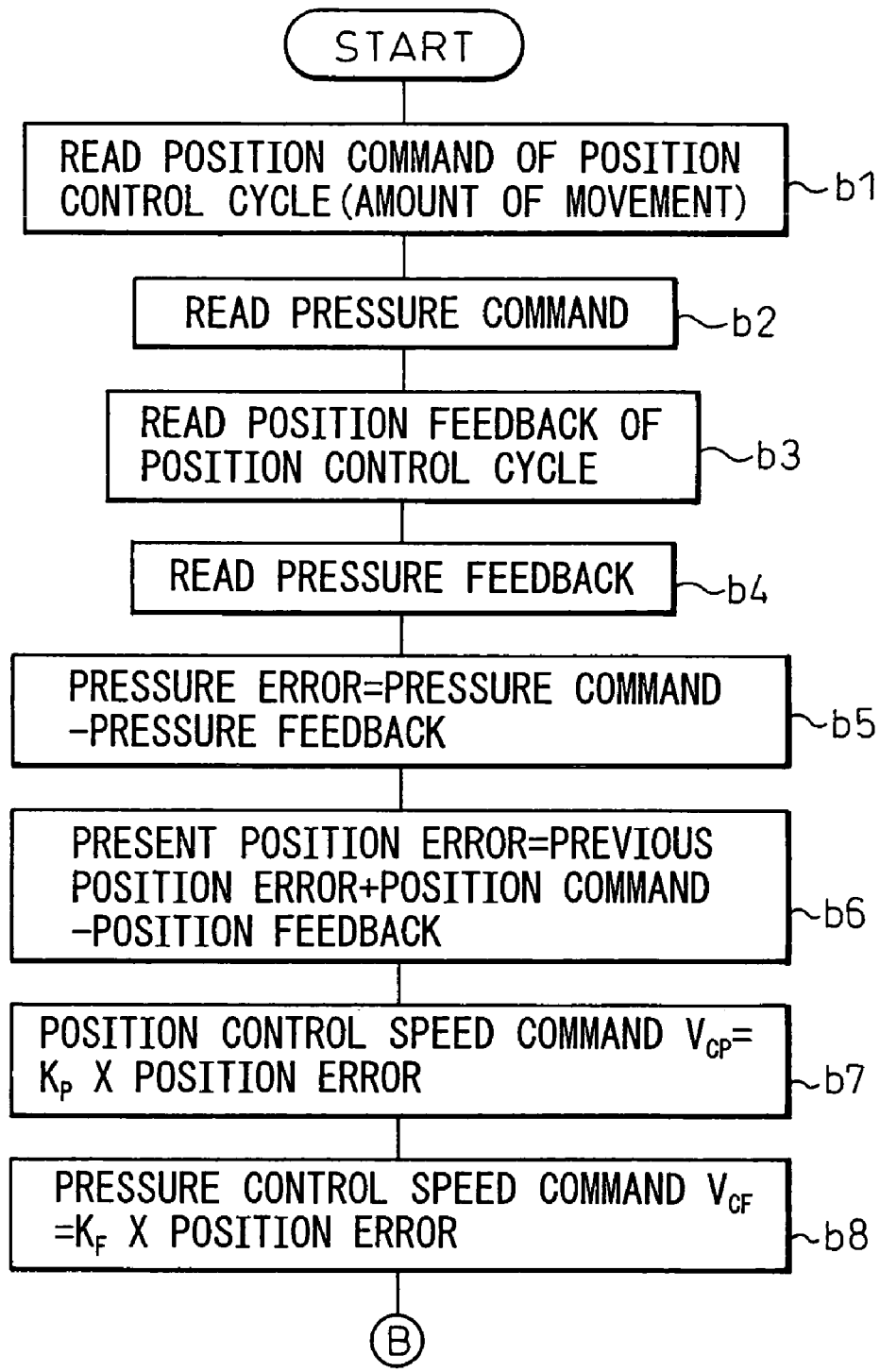

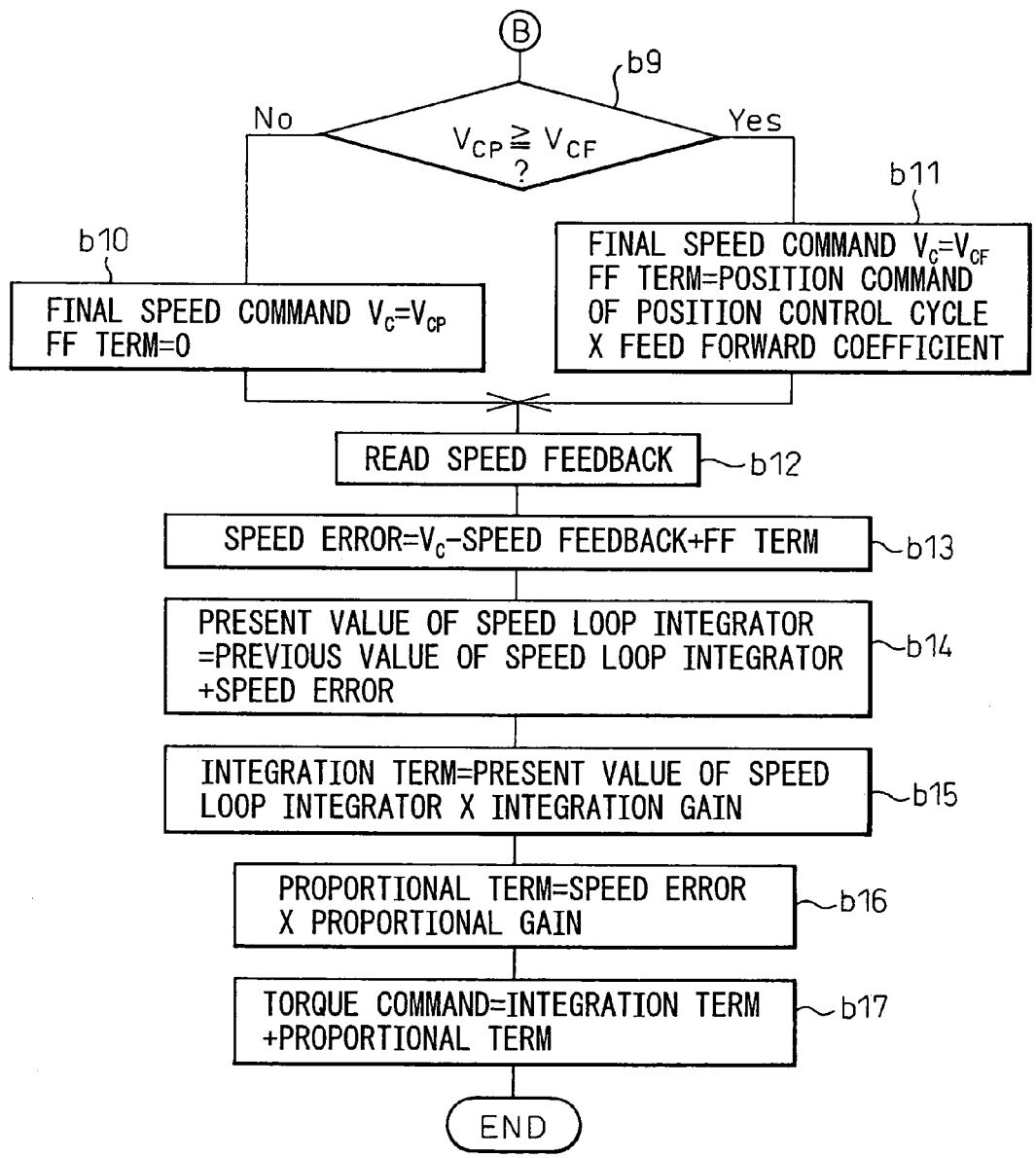

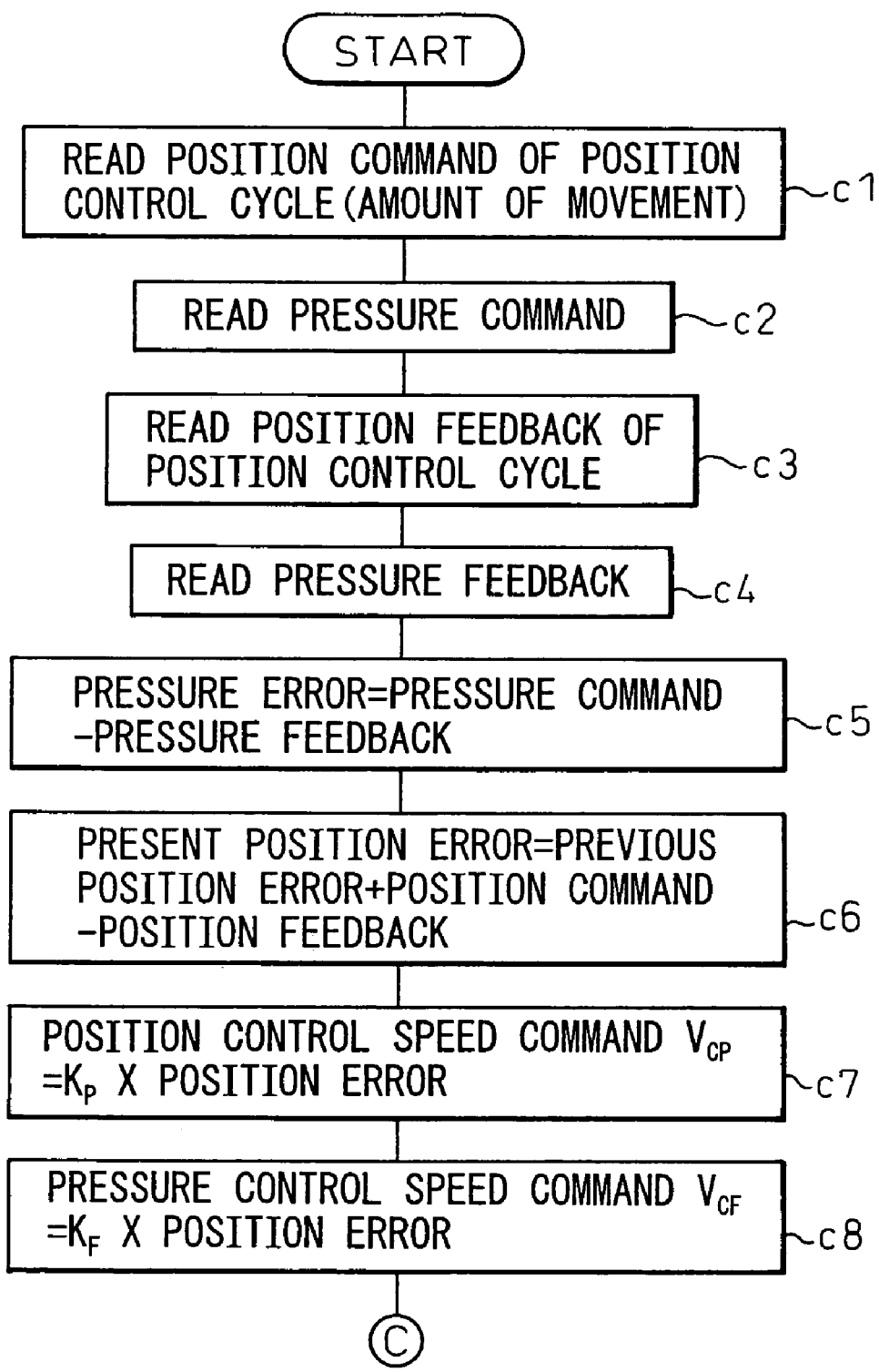

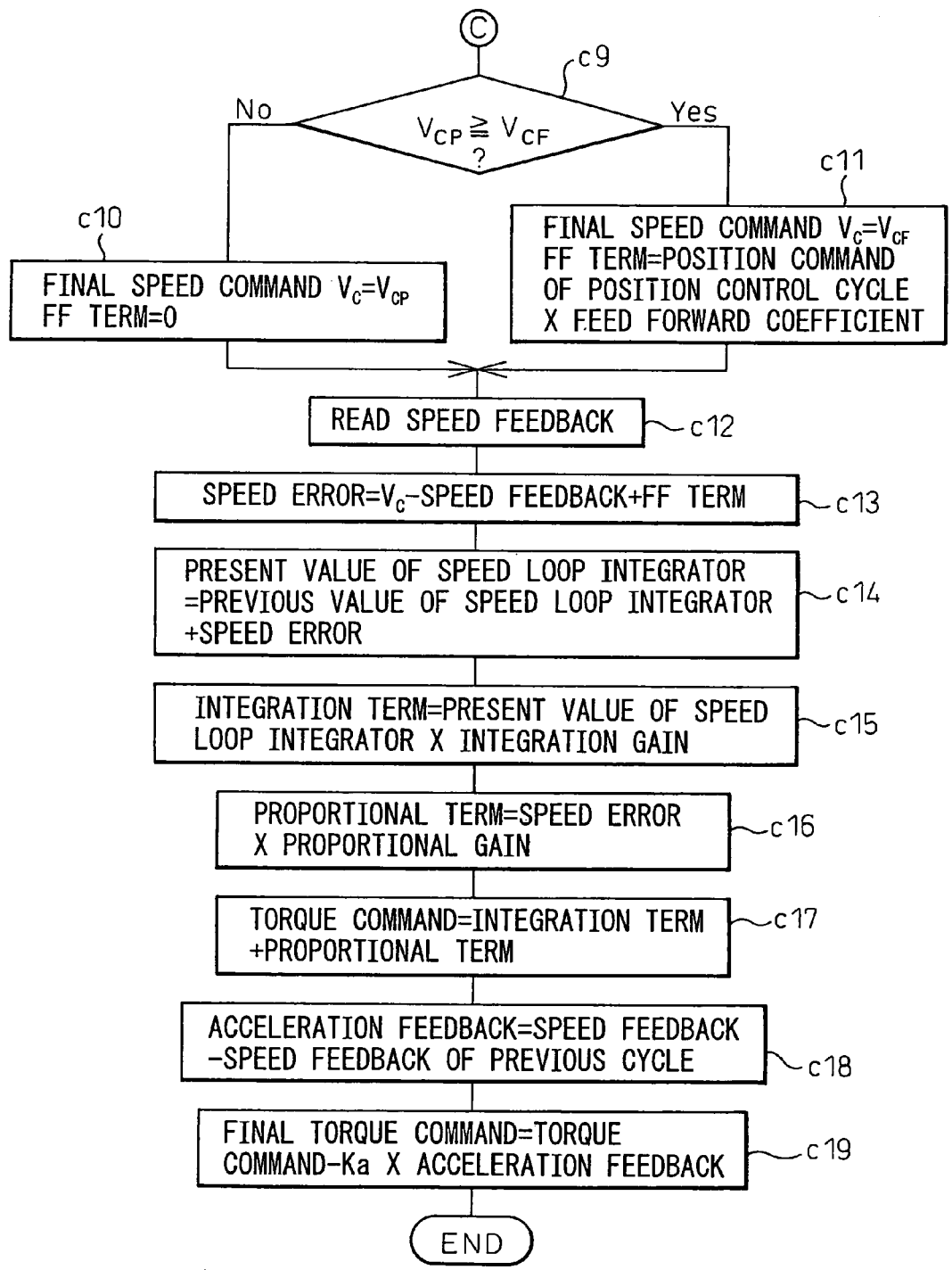

SERVO MOTOR CONTROL UNIT FOR PRESS-FORMING MACHINE

BACKGROUND OF THE INVENTION

1. Field of the Invention

The present invention relates to a servo motor control unit for a press machine or bending machine or a other press-forming machine driven by a servo motor.

2. Description of the Related Art

In a press machine or in a bending machine for bending a metal material, etc., normally oil pressure is used as the drive source for opening and closing the die, but there is also known an electric servo press which uses a servo motor to drive a die fastening member.

In this electric servo press, use is made of a method of controlling a position of a movable die while machining a workpiece and a method of controlling a position of a movable die and, when a workpiece and a movable die abut each other and start a press operation, restricting an output of a servo motor for driving the movable die to maintain a constant pressure in control while machining the workpiece.

However, we searched for patent documents relating to the control of pressure in a press machine, but could not find any press machine technology relevant to the present invention.

In an electric servo press, if simply performing position control to machine a workpiece, since the press pressure is not controlled, good precision machining is not possible. Further, even if setting a torque limit to restrict an upper limit of the press pressure and performing the press machining or bending by open control of the pressure, since the pressure actually applied to the workpiece is unknown, high precision machining is not possible. If providing an electric servo press with a pressure sensor to detect the pressure applied to the workpiece and performing pressure feedback control, the problems arise that the switching from position control to pressure control is difficult and the transition from position control to pressure control cannot be achieved smoothly.

SUMMARY OF THE INVENTION

Accordingly, an object of the present invention is to provide a controller enabling a smooth transition of position control to pressure control when driving a die by a servo motor for machining a workpiece in a press machine or a bending machine or other machine applying pressure to a workpiece by a die for machining it (hereinafter these machines being called "press-forming machines").

According to a first aspect of the present invention, there is provided A servo motor control unit for a press-forming machine which includes a position detector for detecting a position of a die fastening member of the press-forming machine or a servo motor for driving the die fastening member, a speed detector for detecting a speed of the servo motor, a position control processing part for preparing a speed command from a position error comprised of a difference between a position command and a position feedback, and a speed control processing part for preparing a torque command from a speed error comprised of a difference between the speed command and a speed feedback, the servo motor control unit adapted to drive the servo motor based on the prepared torque command to machine a workpiece, wherein the servo motor control unit further comprises: a pressure detector for detecting an actual pressure applied to the workpiece; a pressure control processing part for preparing a speed command from a pressure error comprised of a difference between a pressure command and the actual pressure; a comparing means for comparing the speed command output from the position control processing part with the speed command output from the pressure control processing part; and a switching means for selecting, based on the results of comparison at the comparing means, one of the speed command output from the position control processing part and the speed command output from the pressure control processing part and transferring the selected speed command to the speed control processing part.

The switching means may designate a direction of pressing against the workpiece as positive, select the smaller speed command between the speed command output from the position control processing part and the speed command output from the pressure control processing part as an actual speed command, and transfer the selected speed command to the speed control processing part.

Further, the comparing means may compare an absolute value of the speed command output from the position control processing part with an absolute value of the speed command output from the pressure control processing part, and the switching means may select the speed command with the smaller absolute value between the speed command output from the position control processing part and the speed command output from the pressure control processing part as an actual speed command and transfer the selected speed command to the speed control processing part.

Alternatively, the comparing means may compare an absolute value of the speed command output from the position control processing part with an absolute value of the speed command output from the pressure control processing part, and the switching means may select the speed command output from the position control processing part when the absolute value of the speed command output from the position control processing part is smaller than the absolute value of the speed command output from the pressure control processing part, select the speed command output from the pressure control processing part after it is detected that the absolute value of the speed command output from the pressure control processing part becomes smaller than the absolute value of the speed command output from the position control processing part, and transfer the selected speed command to the speed control processing part.

Preferably, the press-forming machine is adapted so that one die fastening member reciprocates by a predetermined stroke and that the other die fastening member operates as a die cushion, the servo motor is a servo motor for driving the die fastening member operating as the die cushion, and the switching means has a feed forward means for adding a feed forward control amount obtained based on the differentiated value of the position command to an actual speed command when selecting the speed command output from the pressure control processing part as the actual speed command.

According to a second aspect of the present invention, there is provided a servo motor control unit for a press-forming machine which includes a position detector for detecting a position of a die fastening member of the press-forming machine or a servo motor driving the die fastening member, a speed detector for detecting a speed of the servo motor, a position control processing part for preparing a speed command from a position error comprised of a difference between a position command and a position feedback, and a speed control processing part for preparing a torque command from a torque error comprised of a difference between the speed command and a speed feedback, the servo motor control unit adapted to drive the servo motor based on the prepared torque command to machine a workpiece, wherein the servo motor control unit further includes: a pressure sensor for detecting an actual pressure applied to the workpiece; a pressure control processing part for preparing a torque command from a pressure error comprised of a difference between a pressure command and the actual pressure, a comparing means for comparing the torque command output from the speed control processing part with the torque command output from the pressure control processing part, and a switching means for selecting and outputting, based on the results of comparison at the comparing means, one of the torque command output from the speed control processing part and the torque command output from the pressure control processing part.

The switching means may select and output, from between the torque command output from the speed control processing part and the torque command output from the pressure control processing part, the torque command giving the smaller pressure applied to the workpiece as an actual torque command.

Alternatively, the comparing means compares an absolute value of the torque command output from the speed control processing part with an absolute value of the torque command output from the pressure control processing part, and the switching means selects and outputs, from between the torque command output from the speed control processing part and the torque command output from the pressure control processing part, the torque command with the smaller absolute value as an actual torque command.

Alternatively, the comparing means compares an absolute value of the torque command output from the speed control processing part and an absolute value of the torque command output from the pressure control processing part, and the switching means selects the torque command output from the speed control processing part when the absolute value of the torque command output from the speed control processing part is smaller than the absolute value of the torque command output from the pressure control processing part, selects the torque command output from the pressure control processing part after it is detected that the absolute value of the torque command output from the pressure control processing part becomes smaller than the absolute value of the torque command output from the speed control processing part, and outputs the selected torque command as an actual torque command.

Preferably, the die fastening member driven by the servo motor moves in the vertical direction, and the comparing means corrects the torque command output from the speed control processing part by a gravity offset value corresponding to the gravity load applied to the servo motor and compares the corrected torque command and the torque command output from the pressure control processing part.

Preferably, each of these servo motor control units further includes a means for detecting the actual acceleration of the servo motor and correcting the torque command by a torque corresponding to the detected acceleration. Further, preferably the position command and pressure command are simultaneously given from a host control unit.

According to the present invention, when performing press machining, bending, or other pressurizing machining in a press-forming machine, position control of a moving die can be shifted to pressure control seamlessly and smoothly, the machining efficiency becomes better, and good quality machining can be achieved.

BRIEF DESCRIPTION OF THE DRAWINGS

These and other objects, features, and advantages of the present invention will be described in more detail below based on the preferred embodiments of the present invention with reference to the accompanying drawings, in which:

FIG. 5 is a block diagram of a servo motor control unit according to a fourth embodiment of the present invention;

FIGS. 6A and 6B are flow charts of processing performed by a processor of the servo motor control unit according to the first embodiment of the present invention;

FIGS. 7A and 7B are flow charts of processing executed by a processor of the servo motor control unit according to the third embodiment of the present invention; and FIGS. 8A and 8B are flow charts of processing executed by a processor of the servo motor control unit according to the fourth embodiment of the present invention.

DETAILED DESCRIPTION

Below, embodiments of the present invention will be described with reference to the drawings.

Figure 1:
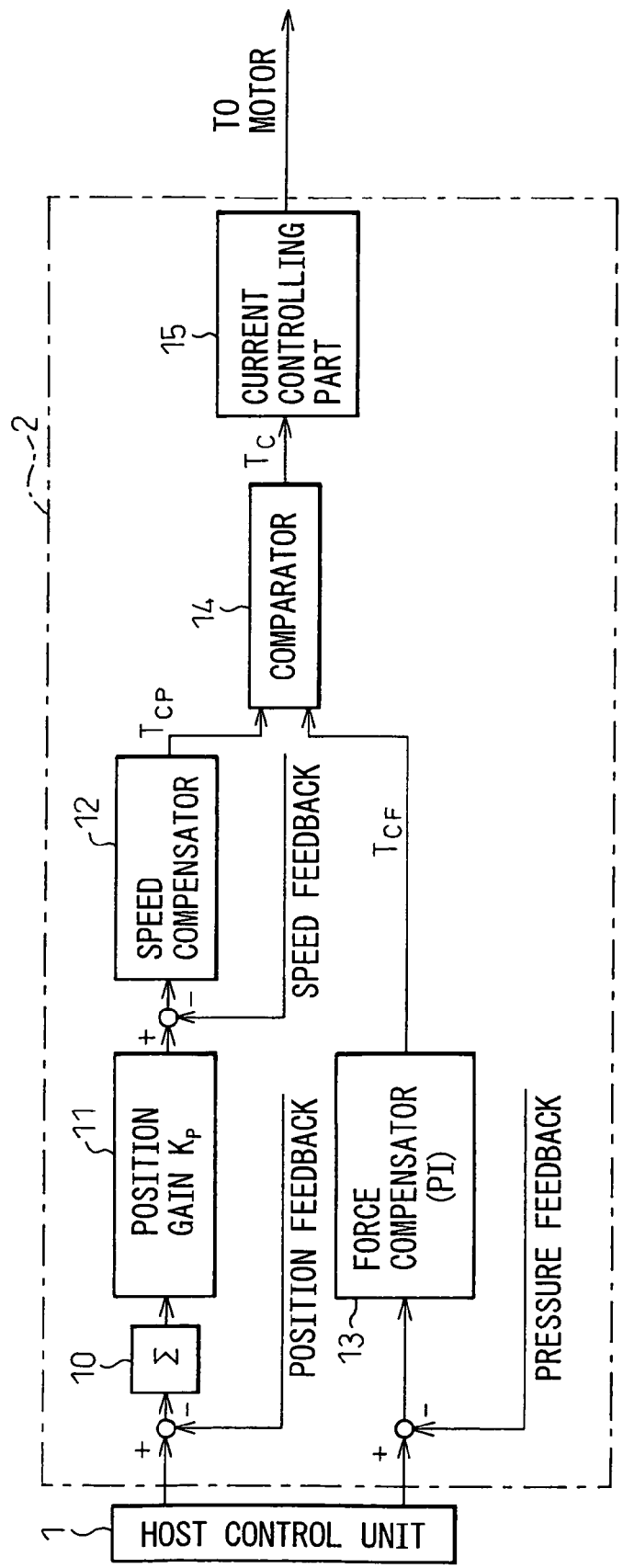
FIG. 1 is a block diagram of a servo motor control unit according to a first embodiment of the present invention.

FIG. 1 is a block diagram of a servo motor control unit according to a first embodiment of the present invention. In FIG. 1, reference numeral 1 is a numerical control unit or other host control unit for controlling a press machine or a bending machine or other press-forming machine. Further, reference numeral 2 indicates a motor control unit according to the present invention. FIG. 1 is expressed as a functional block diagram, but specifically the functional blocks are comprised of a processor for realizing these functions and a memory such as ROM, RAM and the like.

A servo motor of the press-forming machine for driving a die fastening member having a movable die mounted thereon is provided with a position detector and speed detector for detecting a position and speed thereof. Note that the servo motor may also be provided with the speed detector and the die fastening member having the movable die mounted thereon may also be provided with the position detector for detecting the position thereof, in order to respectively detect the position and speed for feedback. Further, a pressure sensor is provided for detecting the pressure given to a workpiece arranged between this movable die and a stationary die attached to a bolster or other fastening member of the press-forming machine.

The servo motor control unit 2 subtracts from the position command from the host control unit 1 the position feedback value detected and fed back by the position detector, obtains the position error by an error counter 10 etc., and multiplies the position error with a position gain $K_P$ for position feedback processing to obtain the speed command. That is, the block 10 of obtaining the position error and the block 11 of the position gain form the position control processing part which performs the position feedback processing. The controlling part subtracts from the obtained speed command the speed feedback value from the speed detector to obtain the speed error and, based the speed error, performs proportional integration or other speed feedback processing by a speed compensator 12 forming the speed control processing part to obtain the torque command $T_{CP}$. The processing performed until obtaining this torque command $T_{CP}$ is the same as the position feedback control processing and speed feedback control processing in conventional servo motor control.

The servo motor control unit 2 of this embodiment is further provided with a pressure control processing part. This pressure control processing part subtracts from the pressure command output from the host control unit 1 the pressure feedback value from the pressure sensor to obtain the pressure error, and a force compensator 13 of the pressure control processing part performs PI control (proportional integration control), based on the pressure error, to obtain a torque command $T_{CF}$.

Further, a comparator 14 compares the torque command $T_{CP}$ obtained by the speed feedback processing of the speed control processing part with the torque command $T_{CF}$ obtained by the pressure feedback processing of the pressure control processing part and employs the torque command giving the smaller pressure applied to the workpiece. When the overshoot or undershoot of the torque command is small, normally the command with the smaller absolute value should finally be employed as the torque command. However, when overshoot or undershoot occurs, the command with the smaller force given to the workpiece is employed. That is, even when the absolute value of one torque command is larger than the absolute value of the other torque command, when that one torque command is a torque command in a direction not applying pressure to the workpiece (a direction of reducing pressure), this torque command, regardless of being larger in absolute value, is smaller in the force applied to the workpiece, so is employed as the final torque command and sent to the current controlling portion 15. The current controlling portion 15, in the same way as conventional servo control, processes the current feedback based on the input torque command (current command) and the feedback value of the current flowing to the servo motor so as to obtain the command to the servo motor and, based on the obtained command, drives the servo motor through an inverter or other servo amplifier. Note that in FIG. 1, reference numeral 11 is a block expressing the position gain.

Figure 2:
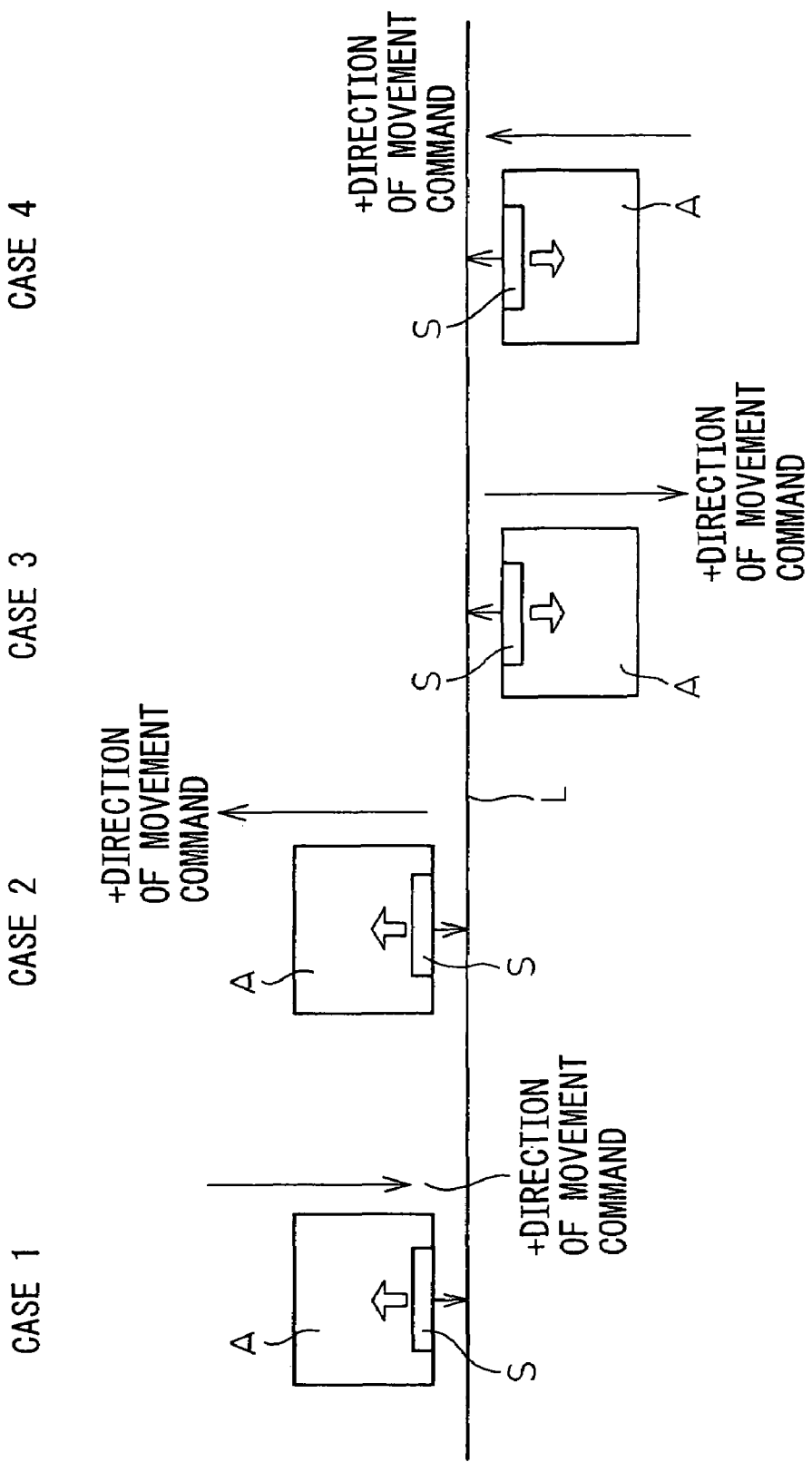
FIG. 2 is an explanatory view for explaining a method of selecting a torque command to be finally employed based on a relationship between a direction of movement of a die fastening member driven by a servo motor controlled by the servo motor control unit of the present invention and a + direction of a position command.

FIG. 2 is an explanatory view for explaining a method of selecting a torque command employed by the comparator 14 based on a relationship between the direction of movement of the die fastening member driven by the servo motor controlled by the servo motor control unit according to the present invention and the + direction of the position command in the press machine or bending machine or other press-forming machine.

In FIG. 2, a line L extending at the center is a line expressing a position of placement of the workpiece. Further, reference notation A indicates a die fastening member, while reference notation S indicates a pressure sensor. Note that the detected pressure output from the pressure sensor S is assumed to be always +.

The case 1 is the case where the + direction of the position command and the direction by which die fastening member A applies pressure to the workpiece are the same. In this case, the position command instructs movement in the + direction and the torque command $T_{CP}$ from the position and speed controlling part is +. When the die fastening member A abuts against the workpiece, the torque command $T_{CP}$ increases. At this time, the comparator 14 employs the torque command giving the smaller force applied to the workpiece. That is, the torque command closer to − (minus) infinity opposite to the direction of the force applied to the workpiece is employed. Due to this, even if the torque command has overshoot or undershoot, the torque command closer to − infinity giving a smaller force applied to the workpiece is constantly employed.

In the case 2 of FIG. 2, the + direction of the position command and the direction in which the die fastening member A applies pressure to the workpiece are opposite to each other. The torque command $T_{CP}$ from the position and speed controlling part is for pressing the workpiece by a torque command having a − value. The torque command $T_{CF}$ from the pressure controlling part is inverted in sign and compared with the torque command $T_{CP}$ from the position and speed controlling part whereby the torque command closer to + infinity is employed. The + side direction of the torque command $T_{CP}$ from the position and speed controlling part is the direction eliminating or reducing the force acting on the workpiece. Further, the direction bringing the torque command from the pressure controlling part inverted in sign closer to + infinity is the direction eliminating or reducing the force acting on the workpiece. Accordingly, in the case 2, by inverting in size and comparing the torque command $T_{CF}$ from the pressure controlling part with the torque command $T_{CP}$ from the position and speed controlling part and employing the one closer to + infinity, a command giving a smaller force applied to the workpiece is employed as the torque command.

In the case 3, the direction by which the die fastening member A moves away from the workpiece is set as the + direction of the position command, and the torque command $T_{CP}$ from the position and speed controlling part by which the die fastening member A applies pressure to the workpiece is a − value. Therefore, if inverting the sign of the torque command $T_{CF}$ from the pressure controlling part in the same way as the pattern 2, comparing it with the torque command $T_{CP}$ from the position and speed controlling part, and employing the one closer to + infinity, the one with a smaller force applied to the workpiece is employed as the torque command.

In the case 4, the + direction of the position command and the direction by which die fastening member A applies pressure to the workpiece are the same. Therefore, in the same way as the case 1, the torque command $T_{CF}$ from the pressure controlling part, without inverting the sign, and the torque command $T_{CP}$ from the position and speed controlling part are compared with each other, and the one closer to − infinity is employed, so that the one giving a smaller force applied to the workpiece is employed as the torque command.

The method of controlling a servo motor according to the present invention differs from the method of servo control of a conventional servo motor in the point that pressure feedback control is added in the control of the servo motor for driving the die fastening member on which the movable die of the above-mentioned press-forming machine is mounted and provision is made of a comparator 14 for comparing the torque command $T_{CP}$ obtained by position speed feedback processing with the torque command $T_{CF}$ obtained by pressure feedback processing to thereby output the torque command giving the smaller pressure applied to the workpiece as the final torque command.

This first embodiment is applied to the case where there is no effect of a gravity load on the movable die driven by the servo motor (the case where direction of movement of the movable die in the press machining or bending is the horizontal direction) or the case where it is small enough with respect to the pressure command to be ignored.

As in case 1 or case 4, the operation of the servo motor control unit according to this first embodiment will be described with reference to the example of the case where the direction by which the die fastening member A applies pressure to the workpiece coincides with the + direction of the position command.

When the press machining or bending, etc. of a workpiece is performed, the position command and predetermined pressure command up to the predetermined position based on the command speed are simultaneously output from the host control unit 1. First, the stationary die and movable die are opened from each other, and the servo motor for driving the die fastening member having the movable die mounted thereon is not subjected to any special load. Therefore, after the servo motor follows the position command, the position error is smaller and a substantially constant state is reached. The servo motor also follows the speed command obtained from this substantially constant position error in speed, so that the speed error also becomes smaller, and the torque command $T_{CP}$ output from the speed compensator 12 becomes a positive small value.

On the other hand, in the initial state where the dies are opened and the movable die does not apply any pressure to the workpiece, the pressure feedback value from the pressure sensor is "0", and the pressure error becomes a large value. As a result, the pressure feedback processed torque command $T_{CF}$ output from the pressure control processing part becomes a large value (positive value), the position and speed feedback processed torque command $T_{CP}$ output from the position and speed control processing part becomes closer to − infinity, and becomes a command giving smaller pressure applied to the workpiece. The comparator 14 outputs the command giving the smaller pressure applied to the workpiece as the final torque command $T_C$. Therefore, at the time of press start or another time of start of movement of the movable die, the output from the speed control processing part is employed, and the servo motor is driven under control in accordance with this output from the speed control processing part.

When the movable die approaches the stationary die and contacts the workpiece placed between the movable die and stationary die so that the workpiece receives pressure from the movable die, the speed of the servo motor decreases and the servo motor is slower in tracking the command position in operation. As a result, the position error and the speed error increase, and the torque command $T_{CP}$ output from the position and speed control processing part gradually increases. As opposed to this, since the workpiece receives pressure from the movable die, the pressure feedback value from the pressure sensor increases, and the error from the pressure command becomes smaller. As a result, the torque command $T_{CF}$ output from the pressure control processing part becomes gradually smaller.

As a result, when the movable die moves toward the stationary die and the pressure acting on the workpiece increases, the torque command $T_{CF}$ output from the pressure control processing part becomes smaller (becomes closer to − infinity) than the torque command $T_{CP}$ output from the position and speed control processing part, and the comparator 14 outputs the torque command $T_{CF}$ output from the pressure control processing part as the final torque command $T_C$ to the current controlling portion 15. After this, the motor is controlled by pressure control until the press machining or bending is completed.

Further, when the press operation etc. is completed and the movable die is moved away from the stationary die to open the dies, a similar operation to the above-mentioned operation is performed and the torque command $T_{CP}$ from the position and speed control processing part becomes closer to − infinity than the torque command $T_{CF}$ from the pressure control processing part, so that at the time of the die opening operation, position and speed feedback processing is performed and the movable die is made to move to the commanded die opening position.

According to the servo motor control unit of the present invention, as described above, position and speed control is shifted to pressure control automatically, without the pressure command changing stepwisely, and seamlessly and smoothly. Accordingly, the force applied to the workpiece is not changed stepwisely, but is applied by gradually increasing it until the predetermined pressure, so that high precision working becomes possible.

The above-mentioned first embodiment is an embodiment of the case where the gravity load on the side of the movable die driven by the servo motor can be ignored. However, in the case that die opening/closing direction at the time of press machining or bending is the vertical direction (up-down direction) and the gravity load acting on the movable die driven by the servo motor becomes large and cannot be ignored, this gravity load is corrected.

The control unit outputs a positioning command to position the movable die to a predetermined position and holds the movable die at a predetermined position. At this time, a movable die side gravity offset value ΔT (opposite sign of detected torque command) is obtained from the torque command output from the speed compensator 12 and is stored. This gravity offset value ΔT represents the force acting due to the gravity load acting on the movable die etc. Further, when compared with the torque command $T_{CF}$ from the pressure controlling part, the value of the torque command $T_{CP}$ output from the speed compensator 12 corrected by exactly the amount of this gravity offset value is compared with the torque command $T_{CF}$ from the pressure controlling part. In the case 1 or case 3 of FIG. 2, the direction of gravity coincides with the + direction of the position command, so the control unit compares the value of the torque command $T_{CP}$ plus the gravity offset value ΔT with the torque command $T_{CF}$ from the pressure controlling part. Further, in the case 2 or case 4 of FIG. 2, the direction of gravity and the + direction of the position command are opposite to each other, so the control unit compares the value of the torque command $T_{CP}$ minus the gravity offset value ΔT with the torque command $T_{CF}$ from the pressure controlling part. As described above, it employs the torque command giving the smaller force acting on the workpiece. When the torque command $T_{CP}$ output from the position and speed controlling part is employed, the torque command $T_{CP}$ output from the position and speed controlling part before correction by the gravity offset value is selected as the final torque command.

Figure 3:
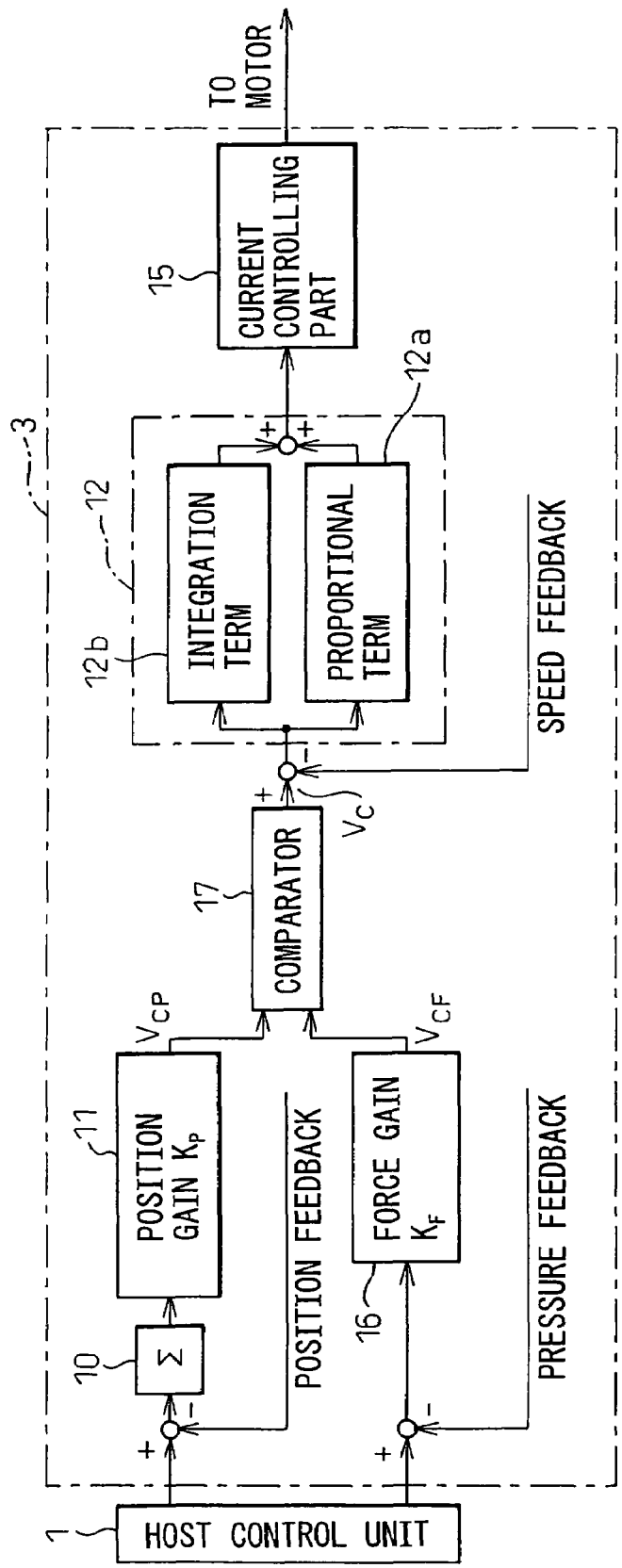
FIG. 3 is a block diagram of a servo motor control unit according to a second embodiment of the present invention.

FIG. 3 is a block diagram of a servo motor control unit according to a second embodiment of the present invention. The servo motor control unit 3 of the second embodiment shown in FIG. 3 differs from the servo motor control unit 2 of the first embodiment in the point that the former uses a speed command instead of a torque command and selects a position control system or a pressure control system. Further, in FIG. 3, elements the same as the elements of the first embodiment shown in FIG. 1 are assigned the same reference numerals, but the comparator 17 and the focus gain block 16 differ from the first embodiment. Further, the speed compensator 12, as shown in detail in FIG. 3, is divided into a proportional term 12a and an integration term 12b.

The servo motor control unit 3 of this second embodiment subtracts from the position command from the host control unit 1 the position feedback value detected by the position detector and fed back at the position control processing part, obtains the position error by the error counter 1 etc. and multiplies the position error with the position gain $K_P$ for position feedback processing so as to obtain the speed command $V_{CP}$. On the other hand, the pressure control processing part subtracts from the pressure command simultaneously output from the host control unit 1 with the position command the pressure feedback value from the pressure sensor to obtain the pressure error and multiplies the pressure error with the focus gain $K_F$ for pressure feedback processing so as to obtain the speed command $V_{CF}$ in the pressure control.

The comparator 17 compares the speed command $V_{CP}$ obtained by position feedback processing of the position control processing part and the speed command $V_{CF}$ obtained by pressure feedback processing of the pressure control processing part and employs the one giving the smaller command value (speed command) in the direction pressing against the workpiece (the larger a speed command in the direction moving away from a workpiece, the smaller the speed command in the direction pressing against the workpiece) as the final speed command $V_C$ for use as the speed command to the speed compensator 12. Explaining this by the example shown in FIG. 2, in the case 1, it compares the speed command $V_{CP}$ from the position controlling part with the speed command $V_{CF}$ from the pressure controlling part and selects the one closer to − infinity as the final speed command $V_C$. In the case 2, it compares the speed command $V_{CF}$ from the pressure controlling part inverted in sign with the speed command $V_{CP}$ from the position controlling part and selects the one closer to + infinity as the final speed command $V_C$. In the case 3, it compares the speed command $V_{CF}$ from the pressure controlling part inverted in sign with the speed command $V_{CP}$ from the position controlling part and selects the one closer to + infinity as the final speed command $V_C$. In the case of case 4, it compares the speed command $V_{CF}$ from the pressure controlling part not inverted in sign with the speed command $V_{CP}$ from the position controlling part and selects the one closer to − infinity as the final speed command $V_C$.

The speed compensator 12 subtracts from this obtained speed command $V_C$ the speed feedback value from the speed detector so as to obtain the speed error and, based on the speed error, multiplies a proportional gain with this speed error in the proportional term, multiplies an integration gain with the cumulative value of the speed error in an integration term, and adds the proportional term and integration term outputs to obtain a torque command for use as a command to the current controlling portion 15. The current controlling portion 15, in the same way as conventional servo control, uses the input torque command (current command) and the feedback value of the current flowing through the servo motor for current feedback processing so as to obtain the command to the servo motor and, based on the obtained command, drives the servo motor through the inverter or other servo amplifier.

The operation of this second embodiment as well will be explained taking as an example the case where the direction by which the die fastening member A shown in the case 1 and case 4 of FIG. 2 applies pressure to the workpiece coincides with the + direction of the position command.

At the start of the press machining or bending, the stationary die and the movable die are in the open state. When the servo motor follows the position command and speed command, the position error becomes small and the speed command $V_{CP}$ obtained from the position error also becomes smaller. However, in the initial state where the dies are opened and the workpiece is not subject to any pressure from the movable die, the pressure feedback value from the pressure sensor is "0" and the pressure error becomes a large value. As a result, the pressure feedback processed speed command $V_{CF}$ output from the pressure control processing part becomes a large value (positive value) and the position feedback processed speed command $V_{CP}$ output from the position control processing part becomes the command giving the smaller pressure applied to the workpiece (the one close to − infinity is employed). As the comparator 14 outputs this smaller command, at the time of start of the press machining or the start of movement of the other movable die, the speed command $V_{CP}$ output from the position control processing part is employed, and the servo motor is driven under control in accordance with this speed command $V_{CP}$.

When the movable die approaches the stationary die, the movable die contacts the workpiece arranged between the movable die and stationary die, and the workpiece is subject to pressure from the movable die. As a result, the speed of the servo motor decreases, and the servo motor is slow in tracking the command position in operation. Therefore, the position error increases, and the speed command $V_{CP}$ output from the position control processing part gradually increases. On the other hand, since the workpiece receives pressure from the movable die, the pressure feedback value from the pressure sensor increases and the error from the pressure command becomes smaller. As a result, the speed command $V_{CF}$ output from the pressure control processing part becomes gradually smaller.

As a result, the movable die moves toward the stationary die and the pressure exerted on the workpiece increases, whereupon the speed command $V_{CF}$ output from the pressure control processing part becomes smaller (becomes closer to − infinity) compared with the speed command $V_{CP}$ output from the position control processing part. The comparator 17 outputs the speed command $V_{CF}$ output from the pressure control processing part to the speed compensator 12. After this, the motor is controlled by pressure control until the press machining or bending is completed.

Further, when the press operation etc. is completed and the movable die is separated from the stationary die to open the dies, a similar operation to the above-mentioned operation is performed and the speed command $V_{CP}$ from the position control processing part becomes smaller than the speed command $V_{CF}$ from the pressure control processing part (becomes closer to − infinity). At the time of a die opening operation, position feedback processing is performed and the movable die is made to move to the commanded die opening position.

Comparing the switching based on a torque command and the switching based on a speed command of the above-mentioned first and second embodiments, the switching based on a speed command (second embodiment) has the merit of enabling stable operation since even if switching to pressure feedback control, speed feedback control is performed.

In the above-mentioned embodiments, the press machining or bending is performed while one die is fastened so as not to be moved and only the other movable die is moved. However, the present invention can also be applied to die cushion control where the movable die is moved, while the other die (stationary die) is also made to move under pressure control. In this case, the movable die, as in the conventional way, just reciprocates by a constant stroke. In synchronization with this reciprocating motion of the movable die, a member having mounted thereon the other die facing the movable die (hereinafter referred to as the "die cushion side die") is driven by the servo motor. At this time, the controlling part of the servo motor simultaneously receives from its host control unit a position command and a pressure command and controls the position, speed, and pressure of the die cushion side die.

Figure 4:
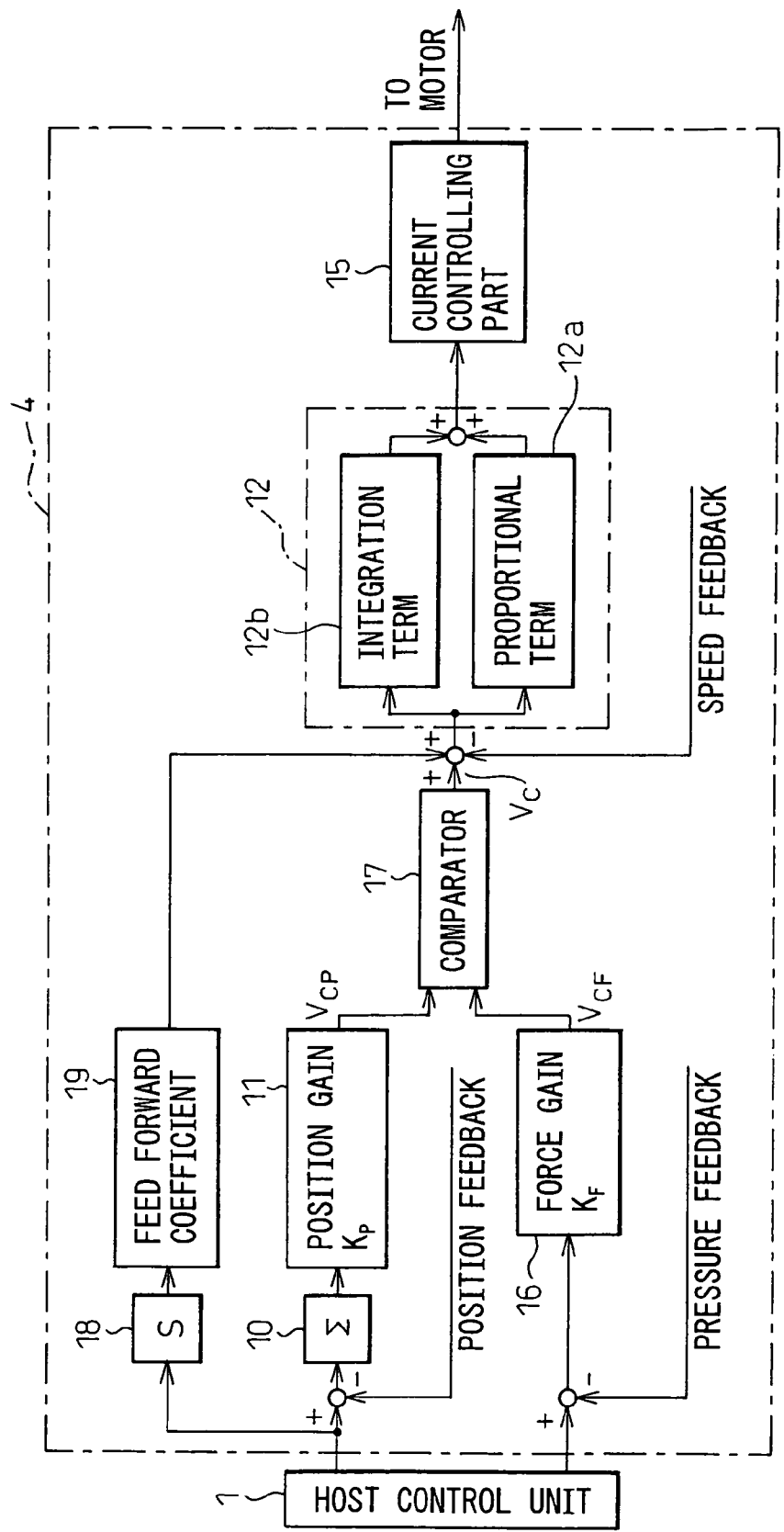
FIG. 4 is a block diagram of a servo motor control unit according to a third embodiment of the present invention.

FIG. 4 is a block diagram of a servo motor control unit according to a third embodiment for performing the above-mentioned die cushion control. A servo motor control unit according to this third embodiment is used for control of the servo motor driving the fastening member having the die cushion side die mounted thereon.

The servo motor control unit 4 of the third embodiment differs from the second embodiment shown in FIG. 3 in that a feed forward control means is added to the servo motor control unit shown in FIG. 3. In FIG. 4, the same elements as in the second embodiment shown in FIG. 3 are assigned the same reference numerals.

The operation of this third embodiment will be explained taking as an example the case where the direction by which the die fastening member A shown in case 1 and case 4 of FIG. 2 applies pressure to the workpiece coincides with the + direction of the position command.

When the movable die reaches a predetermined position, the host control unit simultaneously outputs a position command and pressure command to this servo motor control unit 4. Further, as described in the second embodiment, at first, as the speed command $V_{CP}$ output from the position control processing part is closer to – infinity than the speed command $V_{CF}$ output from the pressure control processing part, the comparator 17 outputs this speed command $V_{CP}$ output from the position control processing part as the final speed command $V_C$. When the movable die contacts the workpiece and starts to apply pressure to the workpiece, the speed command $V_{CF}$ output from the pressure control processing part becomes closer to – infinity than the speed command $V_{CP}$ output from the position control processing part, and therefore the comparator 17 outputs the speed command $V_{CF}$ output from the pressure control processing part as the final speed command $V_C$. The output speed command $V_C$ is subjected to speed feedback control at the speed compensator 12 and current feedback control at the current controlling portion 15. In accordance with the obtained commands, the servo motor for driving one of the dies subjected to the die cushion control is driven.

The control unit obtains the speed command by the pressure feedback control of the pressure control processing part and drives the servo motor based on the obtained speed command. Therefore, when moving by a certain speed, pressure error remains. That is, since the speed feedback control by the speed compensator 12 operates so that the command speed is cancelled by the speed feedback and the speed error becomes "0", a certain degree of a speed command is output, which corresponds to pressure error.

Therefore, since the operation of the movable die is known in advance, a program the same as one for this movable die (position command) is also given to the servo motor control unit 4 driving this die cushion side die. The feed forward control means performs speed feed forward control by differentiating this position command (at block indicated by reference numeral 18) to obtain a value corresponding to the speed, multiplying this with a feed forward coefficient (at block indicated by reference numeral 19) to obtain a feed forward control amount, and adding this to the speed command. Due to this, the amount of speed feedback of the die cushion side die moving pressed by the movable die is cancelled by the speed feed forward control amount to cause the servo motor control unit 4 to operate as if a speed feedback is zero. Along with this, the speed command is almost zero during the operation, and the constant error between the pressure command and the actual pressure is reduced.

Note that the above-mentioned speed feed forward control starts from the time of switching to a speed command obtained by pressure feedback control. The amount of change in speed which cannot be foreseen by feed forward control is compensated for by the speed compensator 12 in accordance with the speed error, so that the stability becomes higher.

FIG. 5 is a block diagram of a servo motor control unit 5 according to a fourth embodiment of the present invention. This fourth embodiment is also a unit 5 for controlling a servo motor for driving one of the dies subjected to die cushion control and differs from the third embodiment shown in FIG. 4 only in that acceleration feedback control is incorporated into the fourth embodiment. The rest is the same. In FIG. 5, elements the same as the third embodiment of FIG. 4 are assigned the same reference numerals.

In this fourth embodiment, the control unit integrates the speed feedback (at block indicated by reference numeral 20) to obtain the feedback value of acceleration, multiplies this obtained acceleration feedback value with the gain (at block indicated by reference numeral 21) to obtain a feedback value of the torque command, obtains the error between the obtained feedback value and torque command, and uses that error as the input to the current controlling portion 15.

In the fourth embodiment, the torque command is corrected based on the actual acceleration of the servo motor, so that further stabler control can be realized. Further, this correction of the torque command by acceleration feedback can also be applied to the servo motor control units shown in FIGS. 1 and 3.

FIGS. 6A and 6B are flow charts of processing which the processor of the servo motor control unit 2 according to the first embodiment shown in FIG. 1 performs with every position control processing cycle.

In the explanation, as in the case 1 shown in FIG. 2, use is made of the example of the case where the + direction of the position command coincides with the direction in which the die fastening member A applies pressure to the workpiece.

First, the processor reads the position command in the position control cycle (amount of movement in the cycle) and reads the pressure command based on the position command and pressure command output from the host control unit (numerical control unit) 1 (step a1 and a2). Next, it reads the position feedback and pressure feedback (step a3 and a4). Further, it subtracts from the pressure command the pressure feedback to obtain the pressure error (step a5) and adds to the position error obtained in the previous cycle the value of the position command obtained at step a1 of the present cycle minus the position feedback obtained at step a3 to obtain the position error of the present cycle (step a6).

The processor adds the pressure error obtained at step a5 to the value of the pressure loop integrator at the previous cycle to obtain the value of the pressure loop integrator of the present cycle (step a7) and multiplies the value of the obtained pressure loop integrator with the integration gain of the pressure loop to obtain the value of the pressure loop integration term (step a8). Further, it multiplies the pressure error obtained at step a5 with the proportional gain of the pressure loop control to obtain the value of the pressure loop proportional term (step a9). It adds the value of the pressure loop integration term to the value of the pressure loop proportional term to obtain the pressure control torque command $T_{CF}$ (step a10).

Further, it multiplies the position error obtained at step a6 with the position gain $K_P$ to obtain the speed command (step a11). Further, it reads the speed feedback (step a12) and subtracts from the speed command the speed feedback to obtain the speed error (step a13), adds the obtained speed error to the value of the speed loop integrator at the previous cycle to obtain the value of the speed loop integrator at the present cycle (step a14), and multiplies the value of the obtained speed loop integrator with the integration gain of the speed feedback control to obtain the value of the speed loop integration term (step a15). Further, it multiplies the speed error obtained at step a13 with a proportional gain of the speed loop to obtain the value of the speed loop proportional term (step a16). Further, it adds the value of the integration term of the speed loop and the value of the proportional term of the speed loop to obtain the position control torque command $T_{CP}$ (step a17).

The processor compares the position control torque command $T_{CP}$ obtained at step a17 and the pressure control torque command $T_{CF}$ obtained at step a10 and employs the one closer to – infinity, that is, in this case, the smaller one (step a18). If the position control torque command $T_{CP}$ is smaller, the final torque command $T_C$ employed is the position control torque command $T_{CP}$ which is used as the command to the next current controlling portion (step a19).

On the other hand, if the pressure control torque command $T_{CF}$ is smaller, the processor employs as the final torque command $T_C$ the pressure control torque command $T_{CF}$ and selects this as the command to the current controlling portion (step a20).

The above processing is performed by the processor of the servo motor control unit 2 with every position control cycle. At first since the pressure error is large, the pressure control torque command $T_{CF}$ is large and the position control torque command $T_{CP}$ is small. Therefore, the processing of step a1 to step a19 is executed for every position control cycle. Further, when the die fastening member A abuts against the workpiece and starts to apply pressure to the workpiece, the position control torque command $T_{CP}$ gradually becomes larger and the pressure control torque command $T_{CF}$ gradually becomes smaller. Further, when the pressure control torque command $T_{CF}$ becomes smaller than the position control torque command $T_{CP}$, the processing of step a1 to step a18 and step a20 is executed. In this way, control of the servo motor for driving the die fastening member A is seamlessly and smoothly switched from position and speed control to pressure control.

Note that in the example shown in FIG. 5, no correction by gravity offset $\Delta T$ was performed, but when performing gravity offset correction, the processor adds to the position control torque command $T_{CP}$ obtained at step a17 the gravity offset value $\Delta T$ to correct it (the + direction of the position command coincides with the direction of gravity), compares this corrected position control torque command ($T_{CP}+\Delta T$) with pressure control torque command $T_{CF}$. When the pressure control torque command $T_{CF}$ is smaller, the processor shifts to step a20 where it employs as the final torque command $T_C$ the pressure control torque command $T_{CF}$. When the pressure control torque command $T_{CF}$ is larger, the processor shifts to step a19 where it employs as the final torque command $T_C$ the uncorrected position control torque command $T_{CP}$ before correction.

The above-mentioned example is of the case 1 shown in FIG. 2, but the same is true for the case 4 as well. Further, in the case 2 or 3, before step a18, the processor inverts the sign of the pressure control torque command $T_{CF}$ obtained at step a10, compares this inverted sign pressure control torque command $-T_{CF}$ with the position control torque command $T_{CP}$ at step a18, and employs among the $-T_{CF}$ and $T_{CP}$ the one closer to + infinity as the final torque command $T_C$.

Further, when the overshoot or undershoot is small, in the above-mentioned cases 1 to 4 as well, at the processing of step a18, it is also possible to simply compare the absolute values of the pressure control torque command $T_{CF}$ with the position control torque command $T_{CP}$ and select the smaller one as the final torque command.

Further, it is also possible that when the absolute value of the pressure control torque command $T_{CF}$ becomes smaller than the absolute value of the position control torque command $T_{CP}$, a flag is set, when the flag is set, the position and speed feedback control processing is not performed (the processing of steps a1, a3, a6, and all to a19 is not performed), but only the pressure feedback processing is performed, and the pressure control torque command $T_{CF}$ obtained by the pressure feedback is used as the final torque command $T_C$.

FIGS. 7A and 7B are flow charts of the processing executed with every cycle of position control by the processor of the servo motor control unit 4 according to the third embodiment shown in FIG. 4 controlling the servo motor for driving the die fastening member A subjected to the die cushion control. In the explanation, as in the case 4 shown in FIG. 2, use is made as an example of the case where the + direction of the position command coincides with the direction in which the die fastening member A driven by the servo motor applies pressure to the workpiece.

The processing from step b1 to step b6 is the same as the processing from step a1 to step a6 shown in FIGS. 6A and 6B and will not be described in detail here. The processor of the servo motor control unit 4 of the third embodiment multiplies the position error obtained at step b6 with a position gain $K_P$ to obtain a position control speed command $V_{CP}$ (step b7) and multiplies the pressure error obtained at step b5 with a force gain $K_F$ to obtain the pressure control speed command $V_{CF}$ (step b8). It compares the obtained position control speed command $V_{CP}$ and pressure control speed command $V_{CF}$ (step b9) and employs the position control speed command $V_{CP}$ which is closer to – infinity (smaller one) as the final speed command $V_C$. If the position control speed command $V_{CP}$ is smaller than the pressure control speed command $V_{CF}$, it employs the position control speed command $V_{CP}$ as the final speed command $V_C$ and makes the value of the feed forward term "0" (step b10).

Further, if the pressure control speed command $V_{CF}$ is smaller than the position control speed command $V_{CP}$, the processor employs the pressure control speed command $V_{CF}$ as the final speed command $V_C$ and multiplies the position command (amount of movement) at the present position control cycle with a feed forward coefficient to obtain a feed forward control amount (value of FF term) (step b11). The amount of movement by the position command at the present position control cycle is the amount of movement in a predetermined time and substantially means the speed. Accordingly, the amount of movement by the position command in the position control cycle means the value obtained by the processing at the integration block 18 in FIG. 4.

Further, the processor reads the speed feedback (step b12), subtracts from the final speed command $V_C$ obtained at step b10 or step b11 the speed feedback, and adds to this the feed forward control amount to obtain the speed error corrected by feed forward control (step b13). Next, it adds the obtained speed error to the value of the integrator at the previous cycle to obtain the value of the integrator at the present cycle (step b14) and multiplies the obtained value of the integrator with an integration gain of the speed feedback control to obtain the value of the integration term (step b15). Then, it multiplies the speed error obtained at step b13 with a proportional gain of the speed feedback control to obtain the value of the proportional term (step b16). Further, it adds the value of the integration term to the value of the proportional term to obtain the torque command and uses the obtained torque command as the command to the current controlling portion (step b17).

In the third embodiment as well, at first, since the pressure error is large and the pressure control speed command $V_{CF}$ is large, the processor of the servo motor control unit 4 executes the processing of step b1 to step b9, step b10, and step b12 to step b17 for every position control cycle. Further, when the pressure applied to the workpiece increases, the pressure control torque command $T_{CF}$ becomes smaller, and the pressure control torque command $T_{CF}$ becomes smaller than the position control speed command $V_{CP}$, the processing of step b1 to step b8, step b11, and step b12 to step b17 is executed for every position control cycle and position control is seamlessly and smoothly switched to pressure control.

The processing shown in FIGS. 7A and B is the processing executed by the processor of the motor control unit 4 for the servo motor according to the third embodiment for driving the fastening member A which has mounted thereon one of the dies subjected to the die cushion control. Note that the processing of the processor of the servo motor control unit 3 for the servo motor for driving the movable die used in a press-forming machine in press machining or bending in which the movable die is driven with respect to the fastened die shown in FIG. 3 sets the feed forward control amount (FF term) of step b11 in FIGS. 7A and 7B to "0" and does not perform feed forward control. The rest of the processing is the same as the processing shown in FIGS. 7A and 7B. Therefore, the explanation of the processing performed by the processor of the servo motor control unit 3 in the second embodiment shown in FIG. 3 will be omitted.

FIGS. 8A and 8B are flow charts of processing performed by the processor of the servo motor control unit 5 according to the fourth embodiment shown in FIG. 5 for every position control cycle. The processing shown in FIGS. 8A and 8B comprises the processing shown in FIGS. 7A and 7B plus the acceleration feedback processing of steps c18 and c19. In the explanation, as in case 4 shown in FIG. 2, use is made of the example of the case where the + direction of the position command coincides with the direction in which the die fastening member A driven by the servo motor applies pressure to the workpiece. Step c1 to step c17 are the same as step b1 to step b17 of the processing shown in FIGS. 7A and B, so will not be explained in detail here.

The processor of the servo motor control unit 5 according to the fourth embodiment shown in FIGS. 8A and B performs processing the same as the processing of the processor of the servo motor control unit 4 according to the third embodiment explained in FIGS. 7A and 7B to obtain the torque command, then subtracts from the speed feedback read at step c3 the speed feedback at the previous cycle to obtain the speed difference, that is, the acceleration feedback (step c18) and uses the value of the torque command obtained at step c17 minus the value of the acceleration feedback obtained at step c18 multiplied with the acceleration feedback gain Ka as the command to the current controlling portion (step c19). The processing at these steps c18 and c19 corresponds to the processing of the block indicated by reference numerals 20 and 21 in FIG. 4.

Note that the processing in the above-mentioned third and fourth embodiments is explained with reference to the case 1 shown in FIG. 2, but in the case 4 as well, similar processing is performed. Further, in the cases 2 and 3, before step b19 or step c9, the processor need only perform processing to invert the sign of the pressure control speed command $V_{CF}$ obtained at step b8 or step c8, compare this inverted sign pressure control speed command $V_{CF}$ with position control speed command $V_{CP}$ at step b9 or step c9, and employ the one closer to + infinity as the final speed command $V_C$.

When the overshoot or undershoot is small, in the above-mentioned cases 1 to 4 as well, at the processing of step b9 or step c9, it is also possible to simply compare the absolute values of the pressure control speed command $V_{CF}$ with the position control speed command $V_{CP}$ and select the smaller one as the final speed command.

Further, when the absolute value of the pressure control speed command $V_{CF}$ becomes smaller than the absolute value of the position control speed command $V_{CP}$, a flag is set. When the flag is set, it is also possible not to perform the position feedback control processing (step b1, b3, b6, and b7, step c1, c3, c6, and c7) and perform only pressure feedback processing and to employ the pressure control speed command $V_{CF}$ obtained by the pressure feedback as the final speed command $V_C$.

What is claimed is:

1. A servo motor control unit for a press-forming machine comprising a position detector for detecting a position of a die fastening member of said press-forming machine or a servo motor for driving said die fastening member, a speed detector for detecting a speed of said servo motor, a position control processing part for preparing a speed command from a position error comprised of a difference between a position command and a position feedback, and a speed control processing part for preparing a torque command from a speed error comprised of a difference between the speed command and a speed feedback, said servo motor control unit adapted to drive said servo motor based on the prepared torque command to machine a workpiece, wherein said servo motor control unit further comprises:
a pressure detector for detecting an actual pressure applied to said workpiece;
a pressure control processing part for preparing a speed command from a pressure error comprised of a difference between a pressure command and the actual pressure;
a comparing means for comparing the speed command output from said position control processing part with the speed command output from said pressure control processing part; and
a switching means for selecting, based on the results of comparison at said comparing means, one of the speed command output from said position control processing part and the speed command output from said pressure control processing part and transferring the selected speed command to said speed control processing part.

2. The servo motor control unit according to claim 1, wherein said switching means designates a direction of pressing against said workpiece as positive, selects the smaller speed command between the speed command output from said position control processing part and the speed command output from said pressure control processing part as an actual speed command, and transfers the selected speed command to said speed control processing part.

3. The servo motor control unit according to claim 1, wherein said comparing means compares an absolute value of the speed command output from said position control processing part with an absolute value of the speed command output from said pressure control processing part, and said switching means selects the speed command with the smaller absolute value between the speed command output from said position control processing part and the speed command output from said pressure control processing part as an actual speed command and transfers the selected speed command to said speed control processing part.

4. The servo motor control unit according to claim 1, wherein said comparing means compares an absolute value of the speed command output from said position control processing part with an absolute value of the speed command output from said pressure control processing part, and said switching means selects the speed command output from said position control processing part when the absolute value of the speed command output from said position control processing part is smaller than the absolute value of the speed command output from said pressure control processing part, selects the speed command output from said pressure control processing part after it is detected that the absolute value of the speed command output from said pressure control processing part becomes smaller than the absolute value of the speed command output from said position control processing part, and transfers the selected speed command to said speed control processing part.

5. The servo motor control unit according to claim 1, further comprising a means for detecting an actual acceleration of said servo motor and correcting the torque command by a torque corresponding to the detected acceleration.

6. The servo motor control unit according to claim 1, wherein the position command and pressure command are simultaneously given from a host control unit.

7. The servo motor control unit according to claim 1, wherein said press-forming machine is adapted so that one die fastening member reciprocates by a predetermined stroke and that the other die fastening member operates as a die cushion, said servo motor is a servo motor for driving said die fastening member operating as the die cushion, and said switching means has a feed forward means for adding a feed forward control amount obtained based on the differentiated value of said position command to an actual speed command when selecting the speed command output from said pressure control processing part as the actual speed command.

8. A servo motor control unit for a press-forming machine comprising a position detector for detecting a position of a die fastening member of said press-forming machine or a servo motor for driving said die fastening member, a speed detector for detecting a speed of said servo motor, a position control processing part for preparing a speed command from a position error comprised of a difference between a position command and a position feedback, and a speed control processing part for preparing a torque command from a speed error comprised of a difference between the speed command and a speed feedback, said servo motor control unit adapted to drive said servo motor based on the prepared torque command to machine a workpiece, wherein said servo motor control unit further comprises:

a pressure detector for detecting an actual pressure applied to said workpiece;

a pressure control processing part for preparing a torque command from a pressure error comprised of a difference between a pressure command and the actual pressure;

a comparing means for comparing the torque command output from said speed control processing part with the torque command output from said pressure control processing part; and a switching means for selecting and outputting, based on the results of comparison at said comparing means, one of the torque command output from said speed control processing part and the torque command output from said pressure control processing part.

9. The servo motor control unit according to claim 8, wherein said switching means selects and outputs, from between the torque command output from said speed control processing part and the torque command output from said pressure control processing part, the torque command giving the smaller pressure applied to the workpiece as an actual torque command.

10. The servo motor control unit according to claim 8, wherein said comparing means compares an absolute value of the torque command output from said speed control processing part with an absolute value of the torque command output from said pressure control processing part, and said switching means selects and outputs, from between the torque command output from said speed control processing part and the torque command output from said pressure control processing part, the torque command with the smaller absolute value as an actual torque command.

11. The servo motor control unit according to claim 8, wherein said comparing means compares an absolute value of the torque command output from said speed control processing part with an absolute value of the torque command output from said pressure control processing part, and said switching means selects the torque command output from said speed control processing part when the absolute value of the torque command output from said speed control processing part is smaller than the absolute value of the torque command output from said pressure control processing part, selects the torque command output from said pressure control processing part after it is detected that the absolute value of the torque command output from said pressure control processing part becomes smaller than the absolute value of the torque command output from said speed control processing part, and outputs the selected torque command as an actual torque command.

12. The servo motor control unit according to claim 8, further comprising a means for detecting the actual acceleration of the servo motor and correcting the torque command by a torque corresponding to the detected acceleration.

13. The servo motor control unit according to claim 8, wherein the position command and pressure command are simultaneously given from a host control unit.

14. The servo motor control unit according to claim 8, wherein said die fastening member driven by said servo motor moves in the vertical direction, and said comparing means corrects the torque command output from said speed control processing part by a gravity offset value corresponding to the gravity load applied to said servo motor and compares the corrected torque command and the torque command output from said pressure control processing part.

* * * * *